May 8, 1962 R. C. GASMIRE 3,032,819
APPARATUS FOR MAKING PLASTIC ARTICLES
Filed Nov. 25, 1958 3 Sheets-Sheet 2
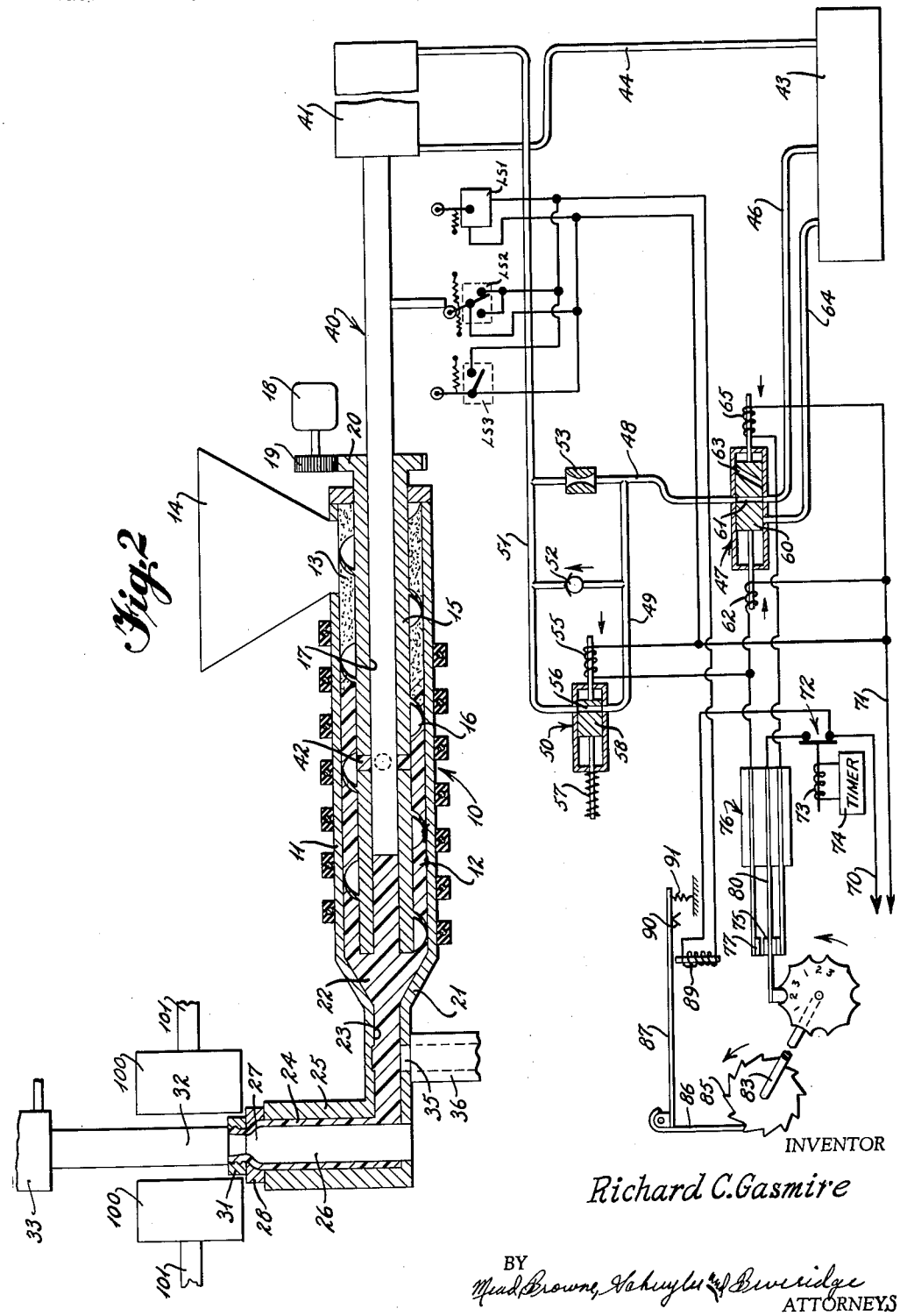
INVENTOR
Richard C. Gasmire
BY
ATTORNEYS

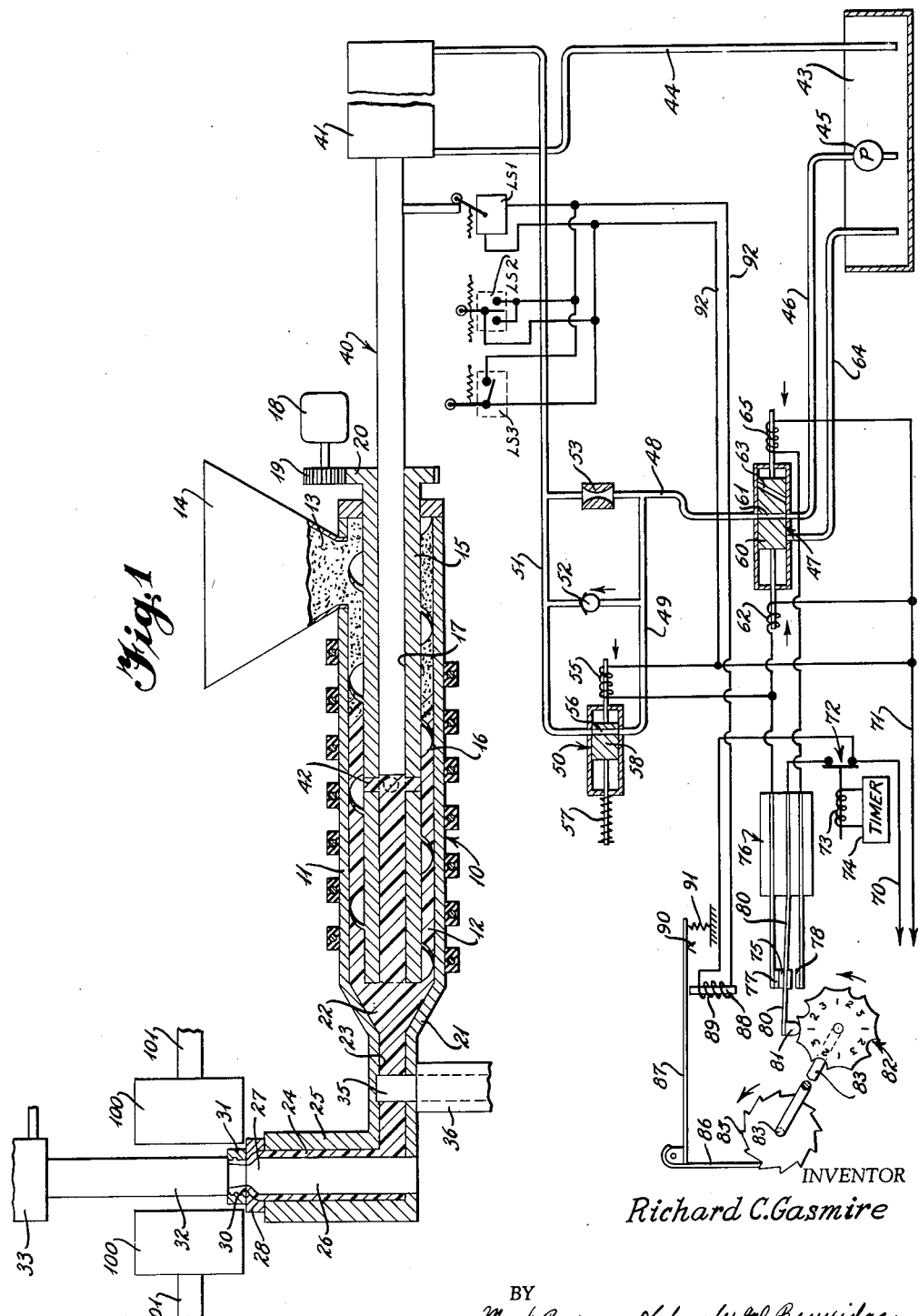

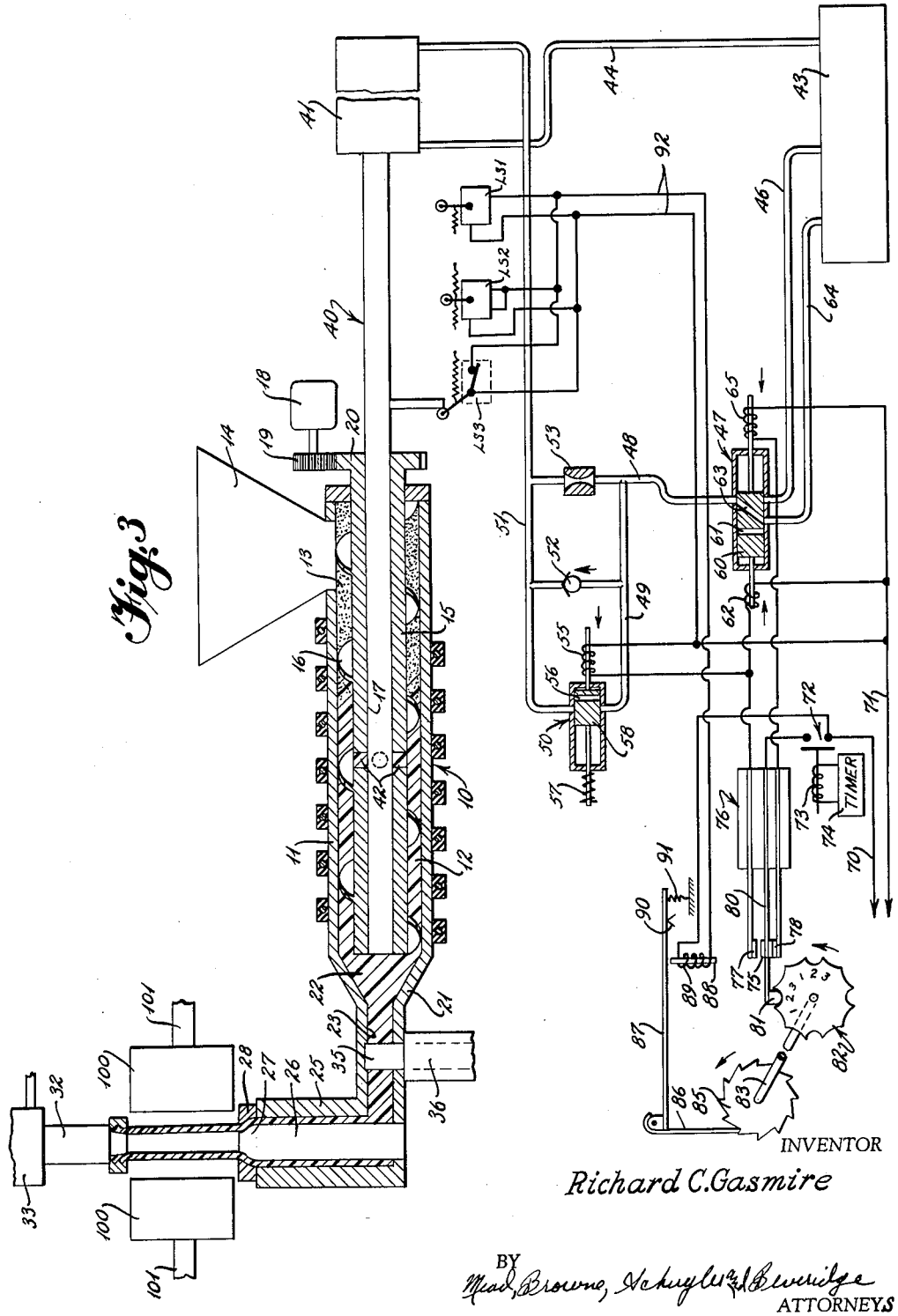

United States Patent Office 3,032,819
Patented May 8, 1962

3,032,819
APPARATUS FOR MAKING PLASTIC ARTICLES
Richard C. Gasmire, Toledo, Ohio, assignor to Owens-Illinois Glass Company, a corporation of Ohio
Filed Nov. 25, 1958, Ser. No. 776,230
4 Claims. (Cl. 18—30)

The present invention relates to an apparatus for making plastic articles and more particularly to an apparatus for making a plastic article by sequential injection molding, extrusion, and blowing operations.

In the manufacture of plastic articles, particularly containers, it has been proposed that a finished portion of the article be formed by injection molding, that a tubular extension be extruded integral with the finished portion, and that the extension then be blown to final shape after enclosure in a blow mold. The making of articles by such a process has been disclosed and claimed in Patent No. 2,804,654, owned by the assignee of the present invention.

The present invention now provides an improved apparatus for carrying out such a method and incorporating a novel extrusion-injection mechanism and novel control means for automatically effecting the extrusion and injection steps of such a method.

The apparatus herein proposed utilizes an extruder for plasticizing plastic material, preferably thermoplastic in nature, and for supplying such material to an extrusion orifice under pressure. At the orifice, material plasticized and supplied by the extruder is initially injection molded into a finish or neck mold directly overlying the orifice. Next, the neck mold is moved away from the orifice and an integral tubular extension is extruded through the orifice. After an extension of the proper length has been formed, the extrusion operation is halted, the extension is enclosed within a blow mold, and the extension is blown to its final configuration.

One primary aspect of this invention is the utilization of a single power-actuated piston to supplement the extruder output pressure during both the injection and the extrusion operations. This piston also controls recirculation of plasticized material in the extruder during those periods at which the extruder output is not utilized.

Another important aspect of this invention resides in the provision of novel control means actuated by displacement of the single power-actuated piston to control the sequence of operation of the apparatus. More accurate control is insured by the utilization of limit switches or the like than is possible by the utilization of timing apparatus of the type heretofore utilized in similar apparatus. The piston is preferably actuated by fluid pressure under the control of valve means energized by a simple, positively acting cam effective to cause sequential automatic piston displacement to perform the piston functions of supplementing extruder output and accommodating recirculation.

It is, therefore, an important object of the present invention to provide an improved apparatus for making plastic articles utilizing sequence-controlled actuating mechanism rather than timer-controlled mechanism.

Another important object is the provision of an improved apparatus for the formation of plastic articles by a combined injection-extrusion technique wherein a single, power-actuated, cyclically operated piston is utilized to supplement the output pressure of an extruder during both injection and extrusion operations.

It is a further object to utilize a power-actuated piston to control recirculation within an extrusion apparatus capable of supplying plastic under pressure for cyclic, combined injection and extrusion operations.

Still another important object is the provision of an improved control mechanism for plastic dispensing apparatus wherein means responsive to the position of a power-displaceable piston is utilized to initiate subsequent displacement of the piston.

It is yet another object of this invention to provide an improved control system for apparatus for dispensing thermoplastic material under pressure and incorporating a control circuit under the primary control positively acting, sequence responsive cam means.

Other and further objects will be more apparent from the following detailed description of a preferred embodiment of my invention and by reference to the drawings forming a part hereof, wherein:

On the drawings:

FIGURE 1 is a diagrammatic representation of an apparatus and control mechanism of the present invention illustrated in an at-rest position immediately prior to operation;

FIGURE 2 is a view similar to FIGURE 1 illustrating the apparatus of the present invention in an operated position; and FIGURE 3 is a view similar to FIGURES 1 and 2 illustrating the apparatus of the present invention in a subsequently actuated condition.

In FIGURES 1, 2 and 3, reference numeral 10 refers generally to a combination extrusion and plasticizing apparatus including a tubular housing 11 surrounding an interior plasticizing chamber 12 adapted to receive raw thermoplastic material 13 from a supply hopper 14 or the like. Extending axially through the chamber 12 is an elongated plasticizing and extruding screw 15 having a peripheral helical thread 16 and an interior axial bore 17. The screw 15 is driven by suitable means, such as a motor 18 driving a spur gear 19 or the like meshing with threads 20 formed of one extremity of the screw and exteriorly of the chamber 12.

The extrusion apparatus 10 also includes a frusto-conical wall 21 defining the restricted tapering outlet 22 from the chamber 12 merging with a conduit 23 leading to a tubular extrusion chamber 24 defined by an exterior peripheral wall 25 radially spaced from and surrounding a fixed core 26. The core 26 is tapered at its upper end, as at 27, and cooperates with an orifice block 28 superimposed on the peripheral wall 25 to define an annular extrusion orifice 30. Adapted to be positioned immediately over the extrusion orifice 30 for full communication therewith is a separable neck or finish mold 31 mounted upon the actuating rod 32 with a double acting fluid pressure cylinder 33 for movement from its position of FIGURE 1 in which it abuts the orifice plate 28 to the elevated position of FIGURE 3.

Interposed between the orifice 30 and the outlet 22 of the chamber 12, and specifically located in the conduit 23, is a cut-off valve sleeve 35 of substantially the same diameter as the conduit 23 and adapted to be extended transversely thereacross to interrupt the flow of plastic material from the plasticizing chamber 12 to the orifice 30. This valve sleeve 35 is adapted for actuation by suitable means, as by the actuating rod of a fluid pressure actuated cylinder (not shown), for axial movement through a tubular guide element 36.

Slidably disposed in the axial bore 17 of the plasticizing screw 15 is an elongated piston indicated generally at 40, this piston being actuatable by a fluid pressure actuated cylinder 41 for reciprocatory motion throughout a stroke illustrated in one extreme position of FIGURE 1 and illustrated in the other extreme position in FIGURE 3. It will be noted that the screw 15 is provided with a plurality of radially extending ports 42 establishing communication between the bore 17 and those portions of the plasticizing chamber 12 intermediate the screw 15 and the housing 11 when the piston is in its retracted position of FIGURE 1. Such communication is interrupted when the piston occupies its positions of either FIGURES 2 or 3.

The cylinder 41 is single acting, that is, the cylinder is effective to displace the piston 40 under pressure only to the left, inasmuch as the left-hand end of the piston 41 is vented to a sump 43 through drain line 44. The right-hand end of the cylinder 41 is vented to a source of pressure, such as the pump 45 through a conduit 46, actuating valve 47, conduits 48 and 49, flow control valve 50, and conduit 51.

It will be noted that the conduits 49 and 51 are connected in parallel at a plurality of points, as through the flow control valve 50, a check valve 52, and a flow restrictor 53. Flow control valve 50 is laterally displaceable under the control of an actuating solenoid 55, which is effective to position a flow passage 56 to interconnect lines 49 and 51, and a compression spring 57 which is effective normally to position a blocking portion of the valve intermediate the lines 49 and 51. The solenoid 55 is controlled by a control circuit hereinafter described in greater detail.

Valve 47 comprises a laterally shiftable valve element having a flow passage 61 interconnecting conduits 46 and 48 upon actuation of a first solenoid 62 and a drain passage 63 interconnecting conduit 48 in a drain conduit 64 leading to the sump 43 when a second solenoid 65 is energized. Thes solenoids 62 and 65 are alternatively actuatable and form part of the control circuit hereinafter described.

The control circuit comprises a pair of main leads 70 and 71 connected to a source of suitable current, preferably direct current. The line 70 is under the control of a timer switch 72, the actuating solenoid 73 of which is controlled by a timing device 74, either electrical of mechanical, effective to open and close the switch 72 in proper timed sequence. The line 70 is connected to a central movable switch contact 75 forming a part of a dipole switch mechanism indicated generally at 76 and including fixed, spaced contacts 77 and 78 contactable by the contact 75. This contact 75 is carried by a spring arm 80, the free end of which carries a cam follower 81 contacting the periphery of a cam 82 having a series of recesses numbered 1, 2 and 3 in consecutive clockwise positions thereabout. When the cam follower 81 is in either cam position 1 or cam position 3, the contacts 75 and 77 are closed, as illustrated in FIGURE 1 of the drawings. When the cam follower 81 is in the recessed cam position 2, the contacts 75 and 78 are closed, as illustrated in FIGURES 2 and 3.

The cam 82 is rotatable in counter-clockwise direction upon a shaft 83 which is common to the cam 82 and to an actuating ratchet 85. This ratchet is adapted to be actuated in a counter-clockwise direction and in stepwise fashion by a vertical latch pawl 86 mounted at the end of a ratchet actuating arm 87 which actually forms the armature of a solenoid assembly including a core 88 and a solenoid winding 89. The arm 87 is pivotal about a fulcrum 90 and is normally urged in a clockwise direction by a tension spring 91. Upon actuation of the solenoid winding 89, the armature 87 is pulled downwardly, thereby depressing the pawl 86 and rotating the ratchet 85 in a counter-clockwise direction.

It will be noted that a plurality of limit switches LS1, LS2 and LS3 are connected for actuating the solenoid winding 89 through lines 92, so that the actuation of any one of the limit switches by the piston 40 will actuate the solenoid winding 89, depress the ratchet arm 87 and actuate the ratchet wheel 85 in stepwise, counter-clockwise fashion. Such actuation of the ratchet wheel 85 will result in rotation of the cam 82 sequentially and close the contacts 75—77 or 75—78 depending upon the rotative position of the cam.

*Operation*

The operation of the device is summarized in Table I in which the instantaneous cam position is noted and correlated with the position of the arm, the method step performed, the limit switch actuated, and the time condition.

TABLE I

| Cam Position | Position of Ram | Method Step Performed | Limit Switch Actuated | Timer Condition |
|---|---|---|---|---|
| 1 | Rear | Injection of Finish | LS1 | Closed. |
| 2 | Center | | LS2 | Closed. |
| 3 | Rear | Ram Retraction Under Extruder Pressure | LS1 | Closed. |
| 1 | Center | Extrusion of Tubular Extension | LS2 | Closed. |
| 2 | Forward | | LS3 | Closed. |
| 3 | Center | Ram Retraction Under Extruder Pressure. | LS2 | Open. |
| 1 | Rear | | LS1 | Open. |
| 1 | Rear | Recirculation | LS1 | Closed. |

More specifically, reference is made to FIGURE 1 of the drawings, wherein it will be seen that the timer switch 72 is closed, the cam 82 has been rotated to such position that the follower 81 lies at cam position 1, the contacts 75 and 77 are closed, the piston 40 is fully retracted to uncover the radial ports 42 of the extruder screw 15 and the neck mold 31 has been lowered to its position immediately overlying the extrusion orifice 30. The apparatus is now in condition for operation.

The flow of current through the contacts 75, 77 will energize solenoids 55 and 62 to position valve elements 58 and 60 in their positions illustrated in FIGURE 1 of the drawings. At this time, the output of the pump 45 will pass through the actuating valve 47 and the lines 48 and 49. Flow control valve body 58 has been positioned to accommodate flow through the passage 56 thereof so that substantially full flow of the pump 45 passes through line 51 to the rear of the cylinder 41. Of course, some additional flow will occur through the restrictor 53, but such flow will be negligible because of the pressure drop across the restrictor, and the easier path of flow afforded through the passage 56.

Forward movement of the piston 40 will accommodate spring return of the limit switch LS1 to its non-actuated position, thereby de-activating the solenoid winding 89 and accommodating elevation of the armature 87 by the spring 91.

Initial forward movement of the piston 40 will close off the radial recirculation passages 42 and subsequent forward movement of the piston will force plastic material through the passage 22, the extrusion chamber 24 and the orifice 30 into the neck mold 31. The sleeve valve 35 has been earlier retracted (by means not shown, as by operation of limit switch LS3) to accommodate the passage of plastic material for the injection molding of the neck mold 31. Of course, retraction of the valve body 35 would have accommodated the flow of plastic material from the extruder screw 15 to the neck mold, but the pressure from the extruder has been supplemented by movement of the piston 40, and the actual injection occurs under the higher pressure generated by the movement of the piston 40.

The piston 40 moves forwardly until it actuates the second limit switch LS2, resulting in energization of the winding 89, the depression of the solenoid armature 87 against the tension spring 91 and the counterclockwise stepped movement of the ratchet wheel 85. Such movement of the ratchet wheel 85 will rotate the shaft 83 in a counterclockwise direction and will result in movement of the cam wheel 82 to its position at which cam recess No. 2 underlies the cam follower 81. The spring arm 80 will accordingly be depressed and contacts 75 and 78 will be closed and contacts 75, 77 will be opened. The opening of the contacts 75, 77 de-energizes the solenoids 55 and 62, and the closure of the contacts 75, 78 energizes the solenoid 65.

The spring 57 will actuate the flow control valve body 58 to the right, shutting off communication between lines 49 and 51, and actuation of the solenoid 65 will move the actuating valve body 60 to the left interconnecting lines 48 and 64 through the drain passage 63. At this time, the right-hand end of the cylinder 41 will be connected with the sump 43 through line 51, flow restrictor 52, line 48, drain passage 63 of valve body 60 and line 64.

Consequently, additional pressure built up within the closed plastic body defined by the plastic in the extruder, the passage 22 and the extruder chamber 24 will move the piston 40 to the right, inasmuch as there is no pressure on the right-hand side of the cylinder 41, and the right-hand side of the cylinder 41 is connected to the sump through the flow restrictor 53 and the valve body 60. During this return movement, the presence of the flow restrictor 53 will retard the movement of the piston and the extent of restriction by the restrictor 53 will determine the pressure and the time necessary to return the piston 40 to its retracted position of FIGURE 1.

The piston returns to the right until such time as limit switch 1 is again energized. Energization of the limit switch 1 will again energize the winding 89, pull down the armature 87 and advance the ratchet wheel 85 to its next successive counter-clockwise position and position the cam follower upon the cam portion 3. The cam position 3 is of the same height as cam position 1, thereby re-establishing contact between contacts 75 and 77 and re-energizing the solenoids 55 and 62 and de-energizing the solenoid 65.

Consequently, the pressure fluid will again pass through lines 49 and 51 to the right-hand side of the cylinder 41 and the piston 40 will be advanced to the left. This advancing continues through actuation of limit switch 2, inasmuch as actuation of the limit switch LS2 will merely re-energize the winding 89, depress the armature 87, and rotate the ratchet wheel and the cam 82 to the next successive counter-clockwise position, namely, cam position 1 which does not alter the position of the cam follower 81 and which does not break the contact between electrical contacts 75 and 77. Thus, the movement of the piston to the right will continue until the position of FIGURE 3 is attained, where limit switch LS3 is actuated. During this movement of the piston 40 to the left to the position of FIGURE 3, the plastic material within the extrusion chamber 24 is expressed upwardly through the orifice 30 as the neck mold 31 is elevated, thereby forming a tubular extension integral with the material filling the neck mold and positioning the extension for enclosure within the separable blow molds.

At this time, the left-hand movement of the piston 40 is complete, the piston occupying a position completely filling the bore 17 of the extruder screw 15. Actuation of limit switch LS3 energizes the solenoid winding 89, depresses the armature 87, moves the cam 82 to its next successive clockwise position, namely, cam position 2, and again brings about electrical contact between contacts 75 and 78, thereby de-energizing solenoid windings 55 and 62 and energizing solenoid winding 65, thus positioning the valve elements 58 and 60 in their positions illustrated in FIGURES 3 of the drawings.

Further, at this time the timer 74 is actuated to open timer switch 72. Opening of the timer switch preferably energizes the sleeve valve element 35 to move the element across the passage 23 blocking communication between the extruder outlet 22 and the orifice 30. Inasmuch as there is no pressure at the right-hand side of the cylinder 41, pressure developed as a consequence of continued rotation of the extruder screw 16 expresses material into the chamber 22 building up pressure therein and acting upon the piston 40 to displace it to the right with the actuating fluid returning to the sump through the flow restrictor 53 and line 48, during passage 63 and line 64.

During consequent return movement of the piston, the limit switch LS2 is again actuated, to energize the winding 89, pull down the armature 87 and rotate the ratchet wheel 85 and the cam 82 to the next successive position, namely, position 3. Although the contacts 75 and 77 are closed at this time, the solenoids 55 and 62 are not de-energized because of opening of the timer switch 72. Consequently, the spring 57 maintains the valve 58 in its right-hand position, and the valve body 60 remains in its left-hand illustrated position of FIGURE 3 because of the prior actuation of the solenoid 62. Upon continued retraction of the piston 40, the limit switch LS1 is actuated when the piston achieves its furthest right-hand position, the position illustrated in FIGURE 1 of the drawings, namely, the cam is actuated to its next successive position, namely, position 1 upon energization of the windings 89, and the valves remain in their position of FIGURE 3. Accordingly, the apparatus is set for the next successive operation following closure of the timer switch 72.

During this at rest position with the valve element 35 in its illustrated position of FIGURES 3 and 1, plasticized material advanced to the left by the screw 16 will be recirculated through the left-hand end of the bore 17 and the radial passages 42 to maintain the material plasticized and in condition for the next successive operation.

While preferred embodiments have been described in detail above, it will be understood that numerous modifications might be resorted to without departing from the scope of the invention as defined in the following claims.

I claim:

1. In an apparatus for supplementing the pressure output of plastic material from an extruder through an orifice, a piston cyclically displaceable from a first retracted position to a second extended position and return to said first position to injection mold a portion of a plastic article and from said first position through said second position to a third further extended position and return through said second position to said first position to extrude a tubular part integral with the injection molded portion of said article; first, second, and third limit switches positioned at said positions, respectively, and actuated by said piston as each position is attained; power means energized in response to actuation of said first and second limit switches to cyclically displace said piston only toward said orifice, means energized in response to actuation of said second and third limit switches venting said piston to the extruder pressure output to accommodate retraction of the piston to its first position from either of its second and third positions, and means for disabling said last named means after every other actuation of said first limit switch.

2. In an apparatus wherein the output of an extruder is supplemented by a power-displaceable fluid actuated piston alternately movable in either of two directions, a control circuit for controlling the direction and extent of displacement of the piston comprising the rotatable cam advanceable rotatably in step-wise fashion, means including a limit switch responsive to displacement of the piston for advancing the cam, a plurality of switch means selectively actuated by successive portions of said cam, and valve means operated by the plurality of switch means for determining the extent and direction of actuation of said piston.

3. In an apparatus wherein the output of an extruder through an orifice is supplemented by a piston displaced toward said orifice by a single-acting fluid pressure power means and moved from the orifice by the extruder output pressure, a control circuit for controlling operation of the power means comprising a rotatable cam advanceable rotatably in step-wise fashion, means including a plurality of limit switches responsive to displacement of the piston for advancing the cam, a source of fluid pressure, and a valve actuated by said cam at different rotative positions thereof for (1) movement to a first position connecting said power means and said fluid pressure source so that the piston supplements extruder output and (2) movement to a second position disconnecting said power means and said fluid pressure source, so that the extruder output pressure retracts the piston.

4. In an apparatus for supplementing the pressure output of plastic material from an extruder, a fluid pressure actuated piston cyclically displaceable from a first retracted position to a second extended position and return to said first position to injection mold a portion of a plastic article and from said first position through said second position to a third further extended position and return through said second position to said first position to extrude a tubular part integral with the injection molded portion of said article; first, second, and third limit switches positioned at said positions, respectively, and actuated by said piston as each position is attained; a source of fluid pressure; a first solenoid energized in response to actuation of said first of said limit switches; a second solenoid energized in response to actuation of said second and third limit switches, valve means actuated by said solenoids, energization of said first solenoid advancing said piston from its first position to its second position and its third position, respectively; energization of said second solenoid venting said piston to the output pressure of said extruder when said piston occupies either of its second and third positions, respectively, and cam means disabling actuation of said second limit switch and said second solenoid during movement of said piston from its first position to its third position.

References Cited in the file of this patent

UNITED STATES PATENTS

| | | |
|---|---|---|
| 2,333,056 | Thoreson et al. | Oct. 26, 1943 |
| 2,392,203 | Tucker | Jan. 1, 1946 |
| 2,680,880 | Corbett | June 15, 1954 |
| 2,680,883 | Ashbaugh | June 15, 1954 |
| 2,831,214 | Eyles et al. | Apr. 22, 1958 |
| 2,926,386 | Hutchinson | Mar. 1, 1960 |

FOREIGN PATENTS

| | | |
|---|---|---|
| 676,602 | Great Britain | July 30, 1952 |